United States Patent
Haynes et al.

(10) Patent No.: US 7,814,131 B1
(45) Date of Patent: Oct. 12, 2010

(54) ALIASING OF EXPORTED PATHS IN A STORAGE SYSTEM

(75) Inventors: Thomas D. Haynes, Tulsa, OK (US);
Mark Muhlestein, Tucson, AZ (US);
David B. Noveck, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 687 days.

(21) Appl. No.: 10/837,120

(22) Filed: Apr. 30, 2004

Related U.S. Application Data

(60) Provisional application No. 60/541,512, filed on Feb. 2, 2004.

(51) Int. Cl.
*G06F 12/00* (2006.01)

(52) U.S. Cl. .................. 707/821; 707/790

(58) Field of Classification Search .......... 707/100, 707/200
See application file for complete search history.

(56) References Cited

U.S. PATENT DOCUMENTS

| | | | | |
|---|---|---|---|---|
| 5,001,628 A | * | 3/1991 | Johnson et al. | 707/10 |
| 5,371,885 A | * | 12/1994 | Letwin | 707/205 |
| 5,452,447 A | * | 9/1995 | Nelson et al. | 707/205 |
| 5,560,008 A | * | 9/1996 | Johnson et al. | 726/5 |
| 5,566,328 A | * | 10/1996 | Eastep | 707/102 |
| 5,708,832 A | * | 1/1998 | Inniss et al. | 709/229 |
| 5,737,523 A | * | 4/1998 | Callaghan et al. | 726/21 |
| 5,742,817 A | * | 4/1998 | Pinkoski | 707/200 |
| 5,784,646 A | * | 7/1998 | Sawada | 710/38 |
| 5,819,296 A | * | 10/1998 | Anderson et al. | 707/204 |
| 6,901,400 B2 | * | 5/2005 | Gillespie et al. | 707/6 |
| 6,968,345 B1 | * | 11/2005 | Muhlestein | 707/103 R |
| 7,103,638 B1 | * | 9/2006 | Borthakur et al. | 709/213 |
| 7,272,640 B1 | * | 9/2007 | Kazemi et al. | 709/218 |
| 7,409,397 B2 | * | 8/2008 | Jain et al. | 707/10 |
| 2003/0078944 A1 | * | 4/2003 | Yamauchi et al. | 707/200 |
| 2003/0093439 A1 | * | 5/2003 | Mogi et al. | 707/200 |
| 2003/0115218 A1 | * | 6/2003 | Bobbitt et al. | 707/200 |
| 2004/0006565 A1 | * | 1/2004 | Shmueli | 707/10 |
| 2004/0024786 A1 | * | 2/2004 | Anderson et al. | 707/200 |
| 2004/0143608 A1 | * | 7/2004 | Nakano et al. | 707/204 |
| 2005/0050107 A1 | * | 3/2005 | Mane et al. | 707/200 |
| 2005/0210072 A1 | * | 9/2005 | Bojinov et al. | 707/200 |
| 2007/0078819 A1 | * | 4/2007 | Zayas et al. | 707/2 |
| 2007/0088702 A1 | | 4/2007 | Fridella et al. | |
| 2009/0106255 A1 | * | 4/2009 | Lacapra et al. | 707/10 |

OTHER PUBLICATIONS

Hohenstein et al., Automatic Migration of Files into Relational Databases, Nov. 1999, ACM, pp. 17-21.*

* cited by examiner

*Primary Examiner*—Apu M Mofiz
*Assistant Examiner*—Jessica N Le
(74) *Attorney, Agent, or Firm*—Blakely, Sokoloff, Taylor & Zafman LLP

(57) ABSTRACT

A storage system, such as a file server, uses pathname aliasing and exports a stored resource to clients by advertising to the clients a different pathname than the actual pathname of the resource.

14 Claims, 9 Drawing Sheets

50

| Advertised Pathname | -Actual Pathname | Filehandle | Permissions |
|---|---|---|---|
| /vol/vol0 | | 12345678 | rw = host 1 |
| /vol/vol0/home | | 87654321 | rw = host 1 |
| /vol/vol1 | | 02468062 | rw = host 2 |
| /foo | /vol/vol2 | 13579753 | rw = host 1<br>rw = host 2 |
| ⋮ | ⋮ | ⋮ | ⋮ |

FIG. 5

ALIASING OF EXPORTED PATHS IN A STORAGE SYSTEM

This application claims the benefit of Provisional U.S. Patent application No. 60/541,512 of T. Haynes et al., filed on Feb. 2, 2004 and entitled, "Aliasing of Exported Paths in NFS," which is incorporated herein by reference.

FIELD OF THE INVENTION

At least one embodiment of the present invention pertains to storage systems, and more particularly, to aliasing of exported paths in a storage system.

BACKGROUND

Modern computer networks can include various types of storage servers. Storage servers can be used for many different purposes, such as to provide multiple users with access to shared data or to back up mission-critical data. A file server is a type of storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID). A single physical file server may implement multiple independent file systems, sometimes referred to as "virtual filers".

One configuration in which a file server can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the Filer products made by Network Appliance, Inc. in Sunnyvale, Calif.

A storage server can also be employed in a storage area network (SAN). A SAN is a highly efficient network of interconnected, shared storage devices. In a SAN, access to stored data, whereas in a NAS configuration, the storage server provides clients with file-level access to stored data. Some storage servers, such as certain Filers from Network Appliance, Inc. are capable of operating in either a NAS mode or a SAN mode, or even both modes at the same time. Such dual-use devices are sometimes referred to as "unified storage" devices. A storage server such as this may use any of various protocols to store and provide data, such as Network File System (NFS), Common Internet File system (CIFS), Internet SCSI (ISCSI), and/or Fibre Channel Protocol (FCP).

A storage server may use any of various protocols to communicate with its clients, such as Network File System (NFS) and/or Common Internet File system (CIFS). The use of CIFS "shares" allows an advertised resource (e.g., one or more files or a portion thereof) to be moved to a new location on a file server. The client does not have to be informed that the resource has moved, and no state has to change on the client. Hence, if a virtual filer is moved from one location to a new one, it is not necessary to visit each and every client to make changes to the imported resources.

NFS exports, however, as used by the commonly deployed versions of the NFS protocol, NFS versions 2 and 3, do not allow for the moving of an advertised resource to a new location on a file server. Clients must be informed that the resource has been moved, and state must be changed on the client. Consequently, when a virtual filer is moved to a new location, it is necessary to visit each and every client to make changes to the imported resources.

SUMMARY OF THE INVENTION

One aspect of the invention is a method which includes storing a resource in a storage system according to a first pathname, and exporting the resource by advertising a second pathname of the resource. Another aspect of the invention is a storage system or other apparatus which performs such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 illustrates a portion an exports table;

DETAILED DESCRIPTION

Figure 1:
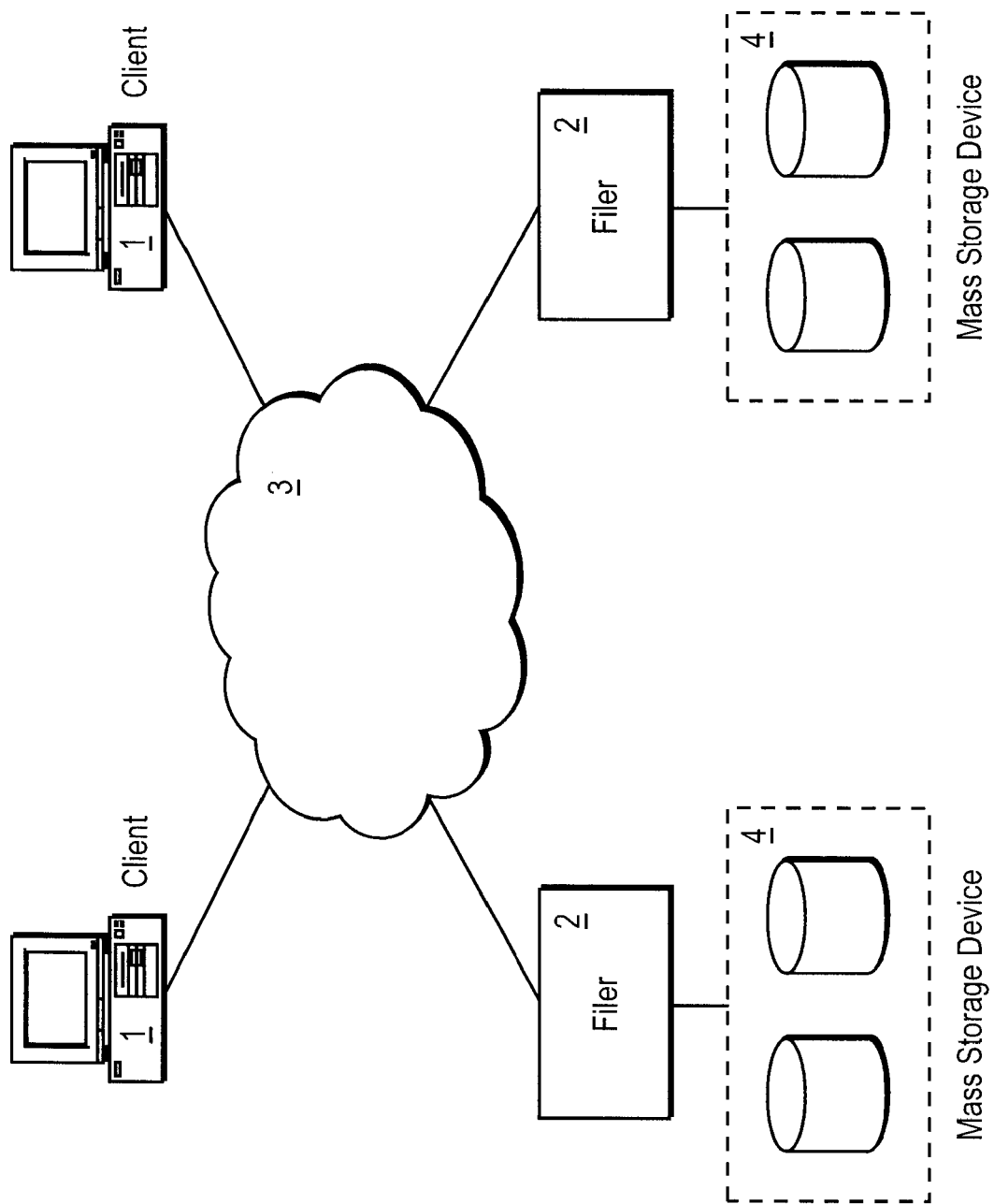
FIG. 1 illustrates a network environment that includes storage systems.

A method and apparatus for aliasing exported paths in a storage system are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

References to "NFS" in this description may be assumed to be referring to NFS version 2 or 3, unless otherwise specified. With NFS, a file server makes available (i.e., "exports") certain stored resources (e.g., files) to certain clients. A particular client can request to "mount" an exported resource (i.e., request to be granted the ability to access an exported resource) in NFS by sending a "mount request" to file server. If the client has permission to access the resource, the file server allows the client to "mount" the resource by returning the filehandle of the resource to the client in response to mount request. As used in this description, a filehandle is a compact key, usually with a fixed length and representable as an integer, which a server returns to a client to describe a pathname.

In accordance with the invention, and as described in greater detail below, an NFS-compliant storage system such as a filer can export a stored resource to clients by advertising to the clients a different pathname than the actual pathname of the resource. What is meant by "advertising" is that the pathname of a resource available for mounting is made known to clients. This enables the storage system to redirect resource locations. As a result, an administrator can make changes to the client over time and remove the indirection at a later date.

In certain embodiments of the invention, this indirection is created by providing a new option that can be used in an export rule for purposes of exporting NFS resources to clients; the option is referred to herein as an "-actual" directive. The "-actual" directive enables an alias to be provided for an exported pathname. Hence, the basic format of an export rule is as follows:

advertised_path -actual=physical_path, [attributes]

For example, the export rule /engineering -actual=/vol/vol1/engineering, rw=.eng.netapp.com, anon=0 states that the physical storage path of /engineering is /vol/vol1/engineering (the "rw" attribute indicates the host(s) (client(s)) with read/write privileges for the pathname). The clients would reference /engineering, but the file server would translate this to /vol/vol1/engineering.

The "-actual" directive allows migration of storage both on a filer and a virtual filer without reconfiguring all clients which have pathnames coded into automounter and /etc/[v]fstab maps. (An automounter is a client based scheme which automatically scans the list of advertised exports from a host and mounts them, without the user having to manually specify to the client which exports to load. The reference to /etc/[v]fstab is a Sun Microsystems reference to a location where all static mount points to be loaded at boot time are stored in recent versions of Sun's Solaris operating System.) One benefit is that any potential downtime is reduced, because administrators do not have to coordinate changes on multiple clients.

If a virtual filer is migrated from one physical filer to another, the underlying backing storage may change, i.e., it might be stored in filerA:/vol/vol17/vfiler13 and moved to filerB:/vol/vol3/vfiler13a on another filer. It might be that there is no corresponding volume or the path is already in use. Once "-actual" path directives have been added, the advertised paths can stay the same even after the virtual filer has been moved.

Note that a filer, as described herein, differs from traditional server architectures, such as servers running the UNIX operating system, when they are used to perform file-serving. Whereas a traditional server associates file systems with regions of a local file system name hierarchy for the purpose of making files accessible by user programs running locally on the server, a filer has no such user programs, and thus, has no need to maintain data structures to provide such local access. Within such a traditional server architecture, this redirection problem may be solved by the creation of a symbolic link from the physical storage path to the advertised path.

The use of the "-actual" directive has two main advantages over that approach:
1) The advertised path does not have to exist anywhere in the physical storage of the filer's file system. That is, with this approach the advertised path does not consume an inode.
2) Each time a redirection is encountered via the "-actual" directive, it is not necessary to load an inode file and perform the redirection. All processing can be handled in the mountd thread layer and bypass potential disk accessing.

FIG. 1 illustrates an example of a network environment in which the invention can be implemented. The system of FIG. 1 includes a number of storage servers 2, each coupled locally to a set of mass storage devices 4, and through an interconnect 3 to a set of clients 1. A path aliasing technique in accordance with the invention can be implemented in each of the storage servers 2. Each storage server 2 may be, for example, an NFS-enabled filer, as is henceforth assumed in this description. Each filer 2 receives various read and write requests from the clients 1 and accesses data stored in the mass storage devices 4 to service those requests.

Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The mass storage devices 4 may be organized into one or more volumes of Redundant Array of Independent Disks (RAID). The interconnect 3 may be essentially any type of computer network, such as a local area network (LAN), a wide area network (WAN), metropolitan area network (MAN) or the Internet, and may implement the Internet Protocol (IP).

Figure 2:
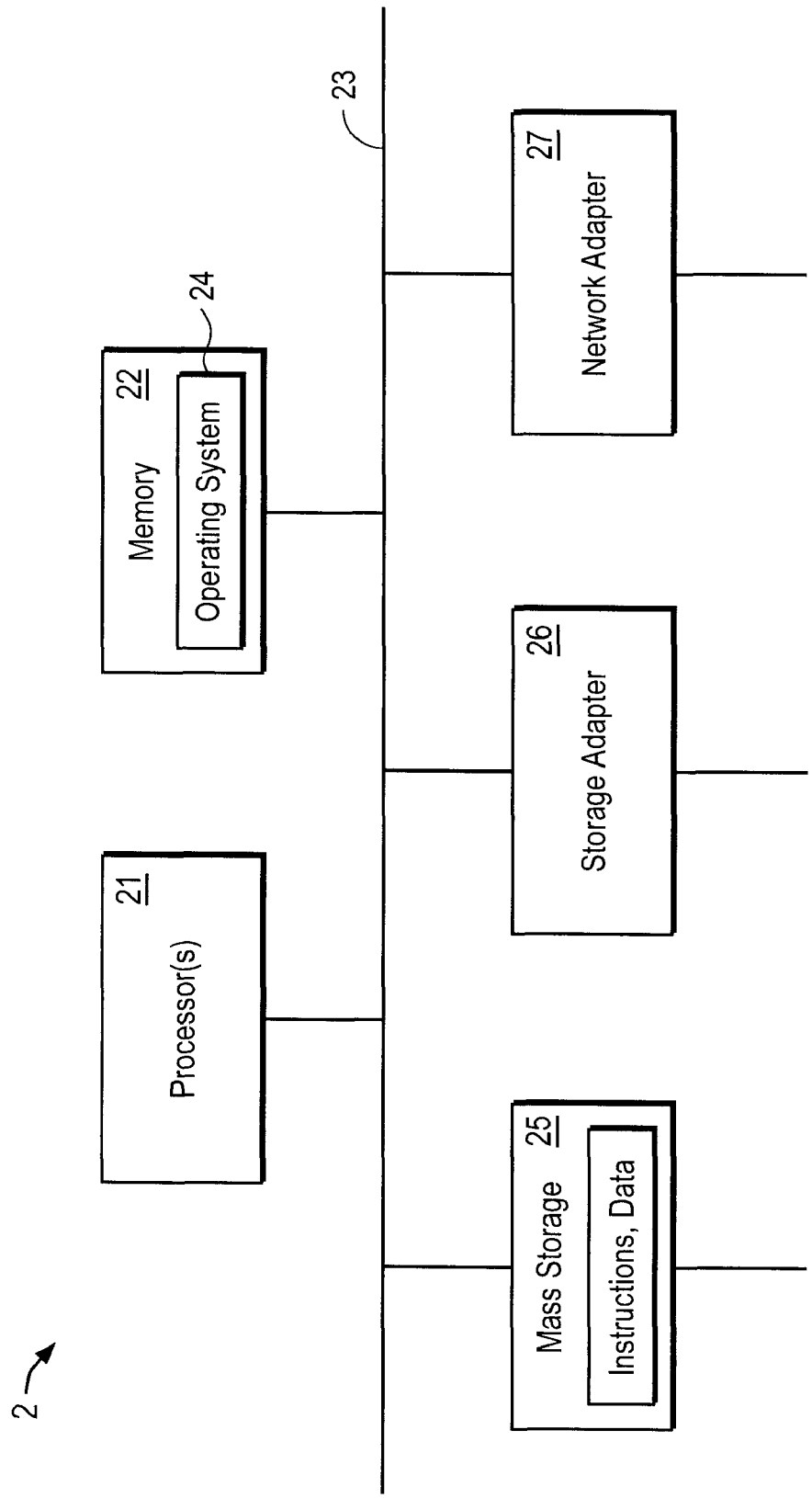
FIG. 2 is a block diagram of a storage system.

FIG. 2 is a block diagram showing the architecture of a filer 2, according to certain embodiments of the invention. Certain standard and well-known components which are not germane to the present invention may not be shown. The filer 2 includes one or more processors 21 and memory 22 coupled to a bus system 23. The bus system 23 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the filer 2 and, thus, control the overall operation of the filer 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 represents any form of random access memory (RAM), read-only memory (ROM), flash memory, or the like, or a combination of such devices. Memory 22 stores, among other things, the operating system 24 of the filer 2, in which the techniques introduced herein can be implemented.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more disks. The storage adapter 26 allows the filer 2 to access the external mass storage devices 4 and may be, for example, a Fibre Channel adapter or a SCSI adapter. The network adapter 27 provides the filer 2 with the ability to communicate with remote devices such as the clients 1 over a network and may be, for example, an Ethernet adapter.

Memory 22 and mass storage devices 25 store software instructions and/or data which may include instructions and/or data used to implement the techniques introduced herein. For example, these instructions and/or data may be implemented as part of the operating system 24 of the filer 2.

Figure 3:
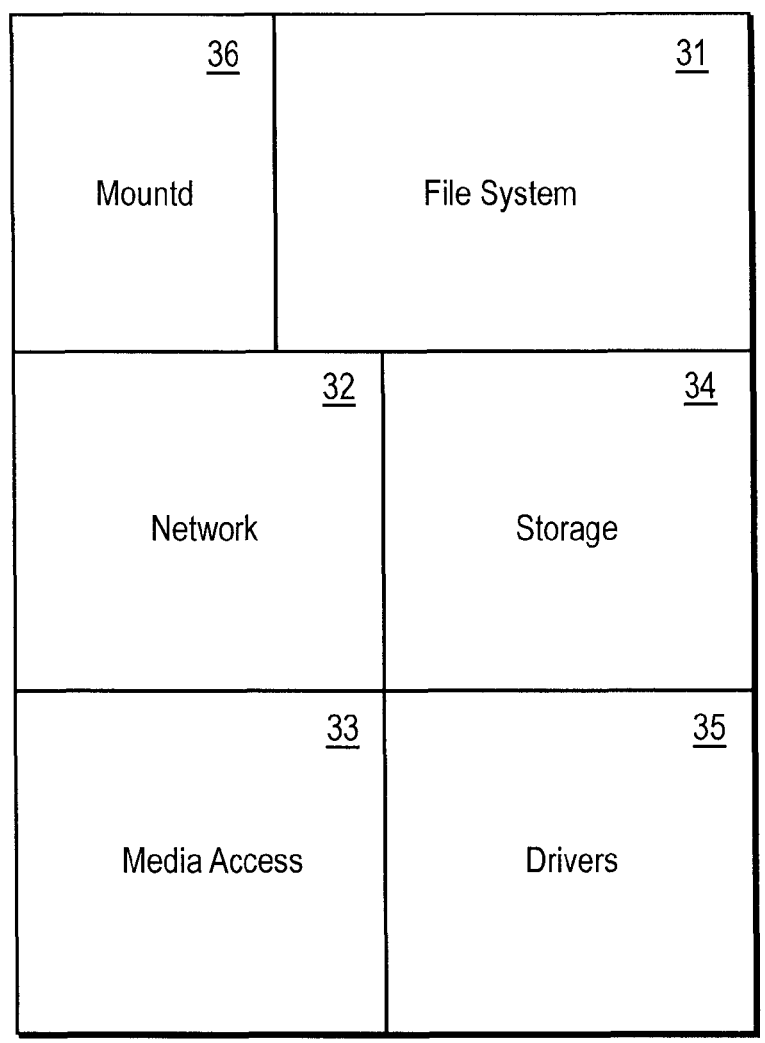
FIG. 3 is a block diagram of the operating system kernel of a storage system.

A shown in FIG. 3, the operating system 24 of the filer 2 has a kernel 30 that includes several modules, or layers. These layers include a file system 31, which executes read and write operations on the mass storage devices 4 in response to client requests, maintains directories of stored data, etc. The kernel 30 further includes a mount deamon ("mountd") module 36, which implements the mount deamon processes for NFS. The mountd module 36 may also implement the resource exportation algorithms and path aliasing algorithms described further below.

"Under" the file system 31 (logically), the kernel 30 also includes a network layer 32 and an associated media access layer 33, to allow the filer 2 to communicate over a network (e.g., with clients 1). The network access 32 layer may implement any of various protocols, such as NFS, CIFS and/or HTTP. The media access layer 33 includes one or more drivers which implement one or more protocols to communicate over the network, such as Ethernet. Also logically under the file system 31, the kernel 30 includes a storage access layer 34 and an associated driver layer 35, to allow the filer 2 to communicate with external mass storage devices 4. The storage access layer 34 implements a disk storage protocol such as RAID, while the driver layer 35 implements a lower-level storage device access protocol, such as Fibre Channel Protocol (FCP) or SCSI. The details of the above-mentioned layers of the kernel 30 are not necessary for an understanding of the invention and, hence, need not be described herein.

There are three main processes of a filer 2 which should now be considered with respect to the present invention:

1) building an exports table
2) processing a mount request from a client
3) processing in NFS request from a client The list of exports (exported resources) advertised by a filer 2 are typically stored in an online exports table. An exports table includes permissions for the various clients, with respect to the export points (exported resources) provided by a filer 2. In addition, as described further below, an exports table includes a mapping of filehandle to the advertised pathname and the -actual pathname (if different from advertised pathname), for each export point. An exports table is used by the filer 2 to process mount requests from clients 1, i.e., to retrieve the filehandle corresponding to the advertised pathname specified in each mount request. The filehandles are subsequently included in NFS (read/write) requests submitted by clients 1 to the filer 2.

The "-actual" directive is used when constructing an exports table, i.e., when an export rule is loaded into the exports table. At that time, the filehandle of the physical storage path is mapped to the filehandle that will be returned to the client in response to a mount request. The filehandle which will be returned to the client is stored in the exports table in association with the advertised pathname and the -actual (physical) pathname. If a virtual filer is then migrated or the underlying path to the physical storage is changed, the filehandle cannot change.

There are two keys to an export point when using NFS: the pathname and filehandle. The pathname is used to process mount requests, and the filehandle is used to process NFS (read/write) requests. The basic process is for a client 1 to supply a pathname in the mount request and for the filer 2 then to return the filehandle for use in NFS requests. The filehandle is unique over the lifetime of the export point, but the pathname can be changed. If the pathname is changed, then all clients which do not have the export mounted will have to their automounter maps and static /etc/[v]fstab maps updated to reflect the new value.

As noted above, pathname indirection is created in accordance with the invention by providing a new option that can be used when exporting NFS resources to clients, referred to herein as the "-actual" directive. The "-actual" directive maps a virtual export point to a physical export point. Hence, in the export rule /vol/vol9/vf1-actual=/vol/vol3/vf1, rw=host2, anon=0 the advertised storage path /vol/vol9/vf1 is bound to the physical storage path /vol/vol3/vf1. Note that if the path /vol/vol9/vf1 exists, it is not accessible from outside the filer 2.

When an NFS client 1 mounts a resource from a filer 2, a mount request is sent to the mountd module 36 on the filer 2. The request provides a pathname that is desired to be shared by the client 1. This pathname can be determined either by a previous request to enumerate the advertised exports (via a show mount command) or by running the export command on the filer 2 to manually determine the set of exports. If the export rule does not contain an "-actual" directive, then the advertised pathname is the physical storage path. For example, in the export rule /vol/vol8/vf2-rw=host1, anon=0

/vol/vol8/vf2 is both the advertised path and the physical storage path. However, if the "-actual" directive is used, then the pathname specified by the -actual directive is the physical storage path. Thus, in response to a mount request, if the pathname provided in the request corresponds to an export which has an "-actual" directive, then the filehandle for the physical storage path determined by the pathname supplied to the "-actual" directive is returned to the client.

The exports table is indexed by two keys: the filehandle associated with the advertised path and the advertised path. When implementing the "-actual" directive, care should be taken to ensure that the filehandle corresponds to the physical storage path and not the advertised path. When filling the exports table (either from an exports file, typically /etc/exports, or via user-initiated non-persistent exports), the filer 2 determines that the "-actual" directive is in use and retrieves the filehandle associated with that path.

This mapping is needed because NFS requests strictly utilize the filehandle and not the path. When the filehandle from an NFS request is used to index to the corresponding export entry, the operation must yield the filehandle associated with the physical storage. Thus, the mapping is done for NFS request as the export is loaded into memory, avoiding any translations when processing a request.

The mapping of the second index occurs when mount requests are sent to the filer 2. In that case, the requesting client 1 only knows the advertised path and probably has no knowledge that the underlying physical storage has changed. Once the advertised path has been used to access the correct export entry, the filer 2 returns the filehandle associated with the "-actual" directive as the filehandle of the mount point.

Figure 4:
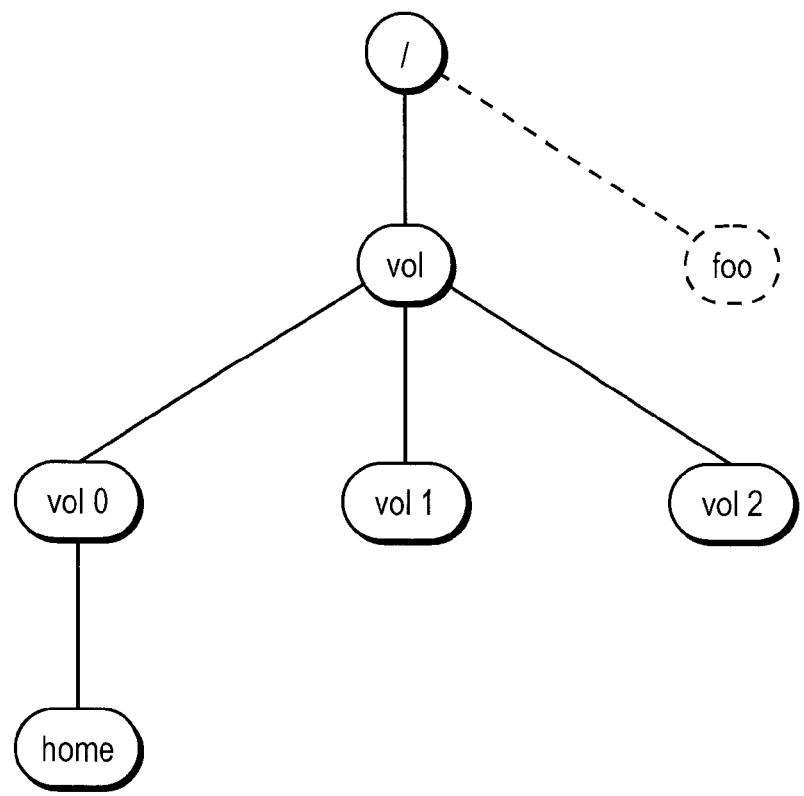
FIG. 4 schematically illustrates a portion of a file system.

Refer now to FIG. 4 which shows a simple example of a portion of a file system in a filer 2. Assume for this example that there are four export points in the file system, having the following four advertised paths, respectively:

/vol/vol0
/vol/vol0/home
/vol/vol 1
/foo

The export rules for these export points may be initially obtained from an export file (e.g., /etc/exports), for example, which also specifies permissions of the various clients with respect to these export points. For example, the export file may specify the following information (and other information not shown, which is not germane to the invention):

/vol/vol0-rw=host1
/vol/vol0/home -rw=host1
/vol/vol1-rw=host2
/foo -actual=/vol/vol2, -rw=host1,host2

Note that the advertised pathname /foo in this example actually corresponds to the physical pathname /vol/vol2, as specified by the "-actual" option in the last export rule.

FIG. 5 shows a simplified example of an exports table corresponding to the above-described export file (with non-germane information not shown). The exports table 50 includes an entry for each export point, wherein each entry includes (among other information): the advertised pathname of the export point, the -actual pathname of the export point (if any), the filehandle of the export point, and any client permissions applicable to the export point.

Figure 6:
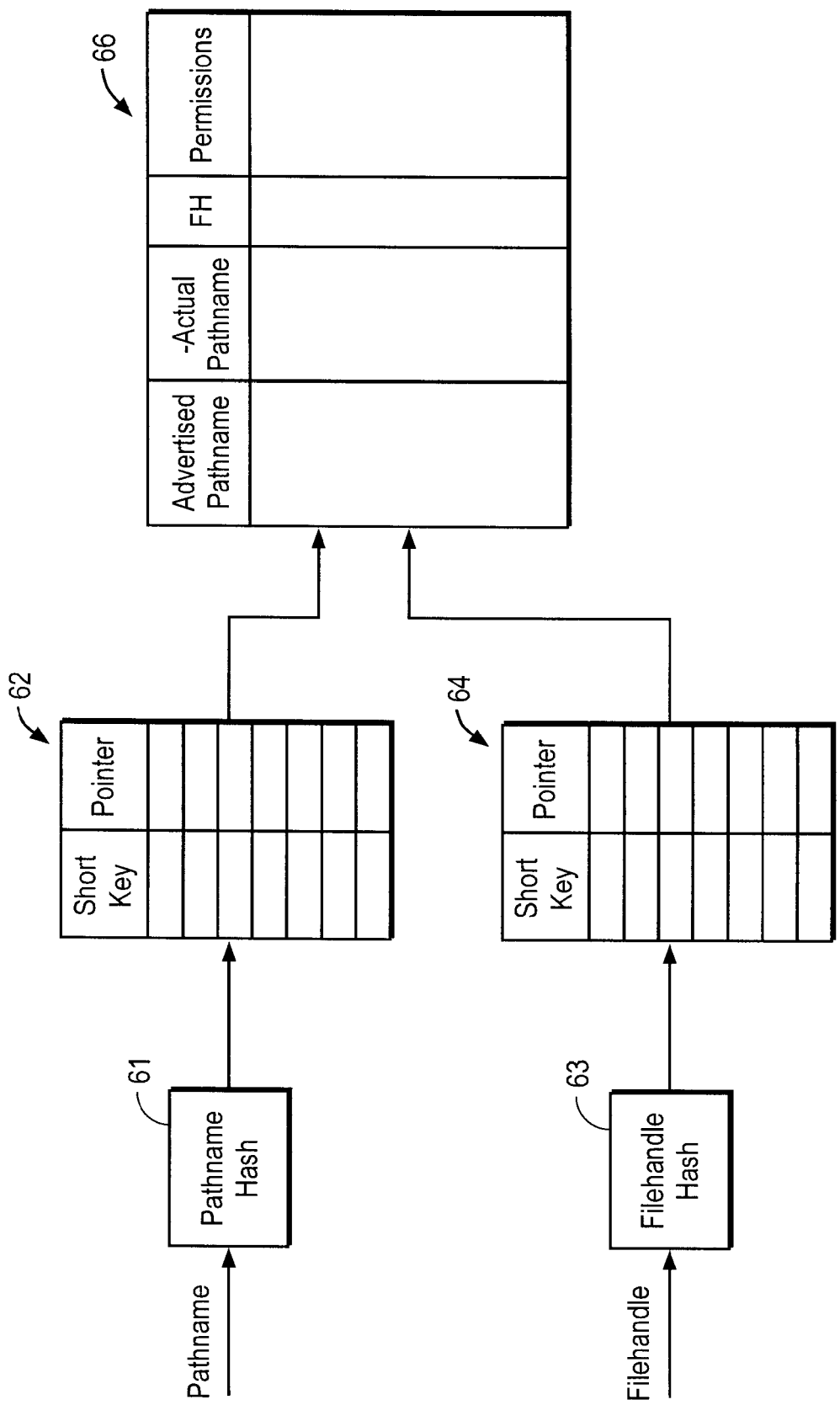
FIG. 6 shows a manner of using a pathname or filehandle to access entries in an exports table.

An exports table is used to look up filehandles and to determine client permissions in response to both mount requests and NFS requests, as further illustrated in FIG. 6 with respect to certain embodiments of the invention. In response to a mount request from a client, the pathname in the mount request is input to a pathname hash unit 61, which applies a hashing function to the pathname to generate a short key. The short key is an index, in a corresponding hash table 62, of a pointer that refers to one or more entries in an exports table 66. The hashing function and short key are used to reduce the amount of storage needed in the filer 2, since multiple pathnames can be associated with the same short key. Any ambiguity thereby introduced is easily removed by subsequently comparing the pathname in the request with the pathnames of any entries in the exports table 66 that correspond to the short key.

Similarly, in response to NFS (read/write) request from a client 1, the filehandle in the NFS request is input to a filehandle hash unit 63, which applies a hashing function to the filehandle to generate a short key. The short key in this instance is an index, in a corresponding hash table 64, of a pointer that refers to one or more entries in the exports table 66.

Figure 7:
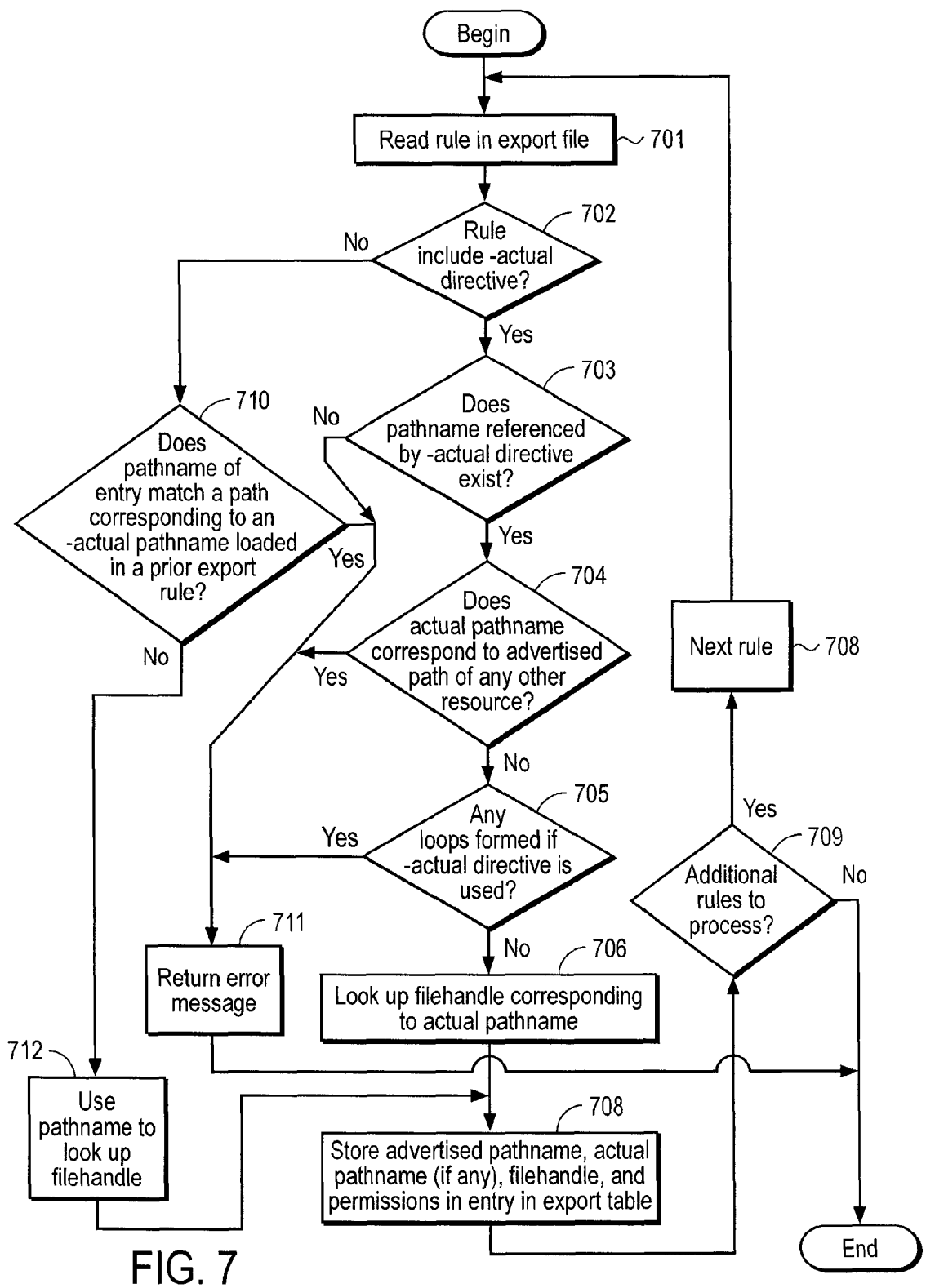
FIG. 7 is a flow diagram showing a process of building an exports table.

Refer now to FIG. 7, which shows the process of building an exports table in a filer 2, according to certain embodiments of the invention. It is assumed, to facilitate description, that the export rules are initially obtained from an export file (e.g., /etc/exports). Initially, the process reads the first rule in the export file at 701. Next, the process determines at 702 whether the rule includes an -actual directive. If the rule does not include an -actual directive, the process branches to 710.

At 710, the process determines whether the pathname of an entry in the exports table matches an -actual pathname loaded into the exports table from a prior export rule. It is necessary to ensure that the advertised path and filehandles are unique. If they are not unique, access permissions cannot be deterministically checked on every request. Hence, if there is such a match at 710, then the process generates an error message at 711, and the process then ends. If there is no such match, then the process uses the pathname to make a call to the file system at 712 to look up the filehandle corresponding to the pathname. The process then proceeds to 707, as described below.

Referring again to 702, if the rule includes an "-actual" directive, then the process determines at 703 whether the pathname referenced by the -actual directive exists. As a byproduct, this check disallows nested loops of the form:

/vol/volA -actual=/vol/volB
/vol/volB -actual=/vol/volC
/vol/volC -actual=/vol/volA when /vol/volA is not a real storage path. If the pathname referenced by the actual directive does not exist, then the process generates an error message at 711, and the process then ends.

If the pathname does exist, then the process determines at 704 whether the -actual pathname corresponds to the advertised pathname of any other resource. Consider the following:

/vol/volX -rw
/mapped -actual=/vol/volX,ro

The advertised path and filehandle are unique in the exports tables, so that access permissions can be deterministically checked on every request. If the actual path corresponds to that of an export already loaded, the duplication rules in force by the operating system are used, which may mean overwriting the export already loaded. Referring back to FIG. 7, therefore, if the -actual pathname is determined at 704 to correspond to the advertised pathname of another resource, then the process generates an error message at 711, and the process then ends.

If the -actual pathname does not correspond to the advertised pathname of any other resource at 704, then the process determines at 705 whether any loops would be formed if the -actual directive is used. Consider the following example:

/vol/volY -actual=/vol/volZ,rw
/vol/volZ -actual=/vol/volY,ro

The first export rule should be loaded successfully, because there is no loop. When the second export rule is loaded, the operation should fail because it sets up a loop.

With just one layer of indirection and the rule that the "-actual" directive must point to real storage, a loop such as above is only confusing for administrators and users; it does not pose any problems in code. As shown earlier, the loop /vol/volA -actual=/vol/volB
/vol/volB -actual=/vol/volC
/vol/volC -actual=/vol/volA is also problematic only for human understanding, if the "-actual" directive is restricted to real storage and all exports are not considered when doing the determination of real storage for /vol/volC. In other words, if all export rules are first loaded and then an attempt is made to determine storage paths based on all available mappings, an infinite loop could result.

To avoid this problem, only one level of indirection is evaluated, and all target paths of the "-actual" directive are forced to have corresponding physical storage.

Referring again to FIG. 7, therefore, if any loops would be formed by using the -actual directive (705), then the process generates an error message at 711, and the process then ends. If no loops would be formed, then at 706 the process makes a call to the file system 31 to look up the filehandle corresponding to the -actual pathname.

At 707, after the filehandle is received from the file system, the process stores the filehandle in the entry in the exports table for the particular export point, in association with the advertised pathname and the -actual pathname (if any). Following 707, if there are additional rules in the export file remaining to be processed (709), then the process accesses the next rule in the export file at 708, and the entire process repeats, until all of the export rules have been processed.

Figure 8:
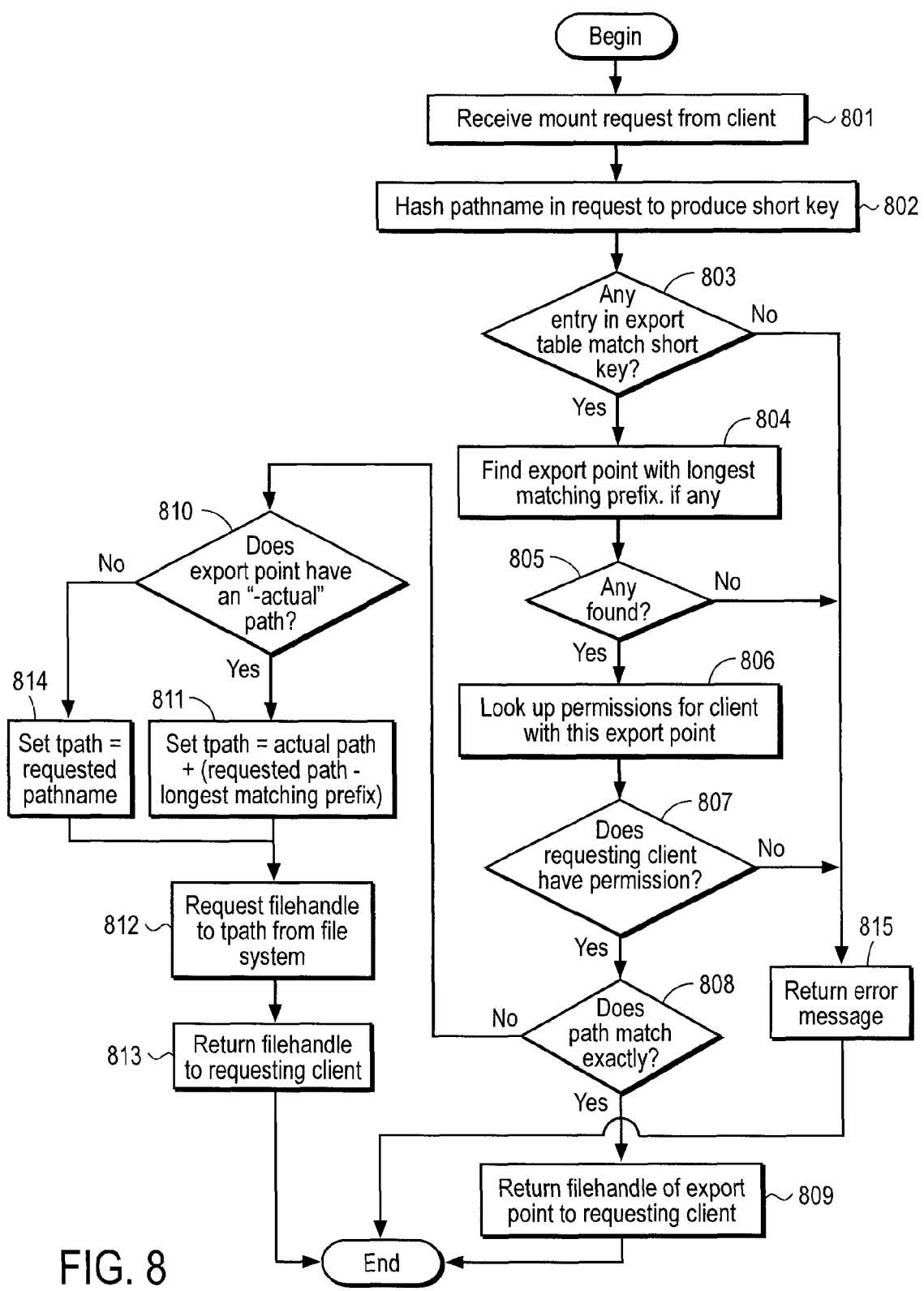
FIG. 8 is a flow diagram showing a process of processing a mount request.

The second major process performed by a filer 2 is the process of responding to a mount request from a client. Refer now to FIG. 8, which shows an example of such process according to certain embodiments of the invention. Initially, a mount request is received from a client at 801. The process then hashes the pathname in the mount request at 802 to produce a short key. The process then determines at 803 whether any entry in the exports table matches the short key.

If there is no matching entry, then the process returns an error message to the client at 815, and the process then ends.

If there is a matching entry, then at 804 the process determines which of the export points that correspond to the generated short key (if any) has the longest pathname prefix matching the pathname in the mount request. Some additional explanation may be useful here. Assume the export points in a file system are:

/vol/volX
/vol/volY
/vol/volZ

Assume further that a client requests to mount /vol/volY/dir1, which is not an export point. In this example, /vol/volY is the export point that has the longest matching pathname prefix. (Of course, in some cases an exported pathname may exactly match the pathname in the mount request in its entirety; in that event, the entire pathname of the export is considered to be the matching "prefix" for purposes of 804.) Accordingly, in cases where the pathname in the mount request only partially matches the pathname of any export point (i.e., a matching prefix), the access permissions for that request will be determined from the permissions of the export point that has the longest matching pathname prefix, if any.

Referring again to FIG. 8, therefore, if no pathname in the exports table has a pathname prefix that matches the pathname in the request (804), then the process returns an error message to the client at 815, and the process then ends. If there is a matching prefix in the exports table, then the process continues from 806.

At 806 the process looks up the permissions for the requesting client for the export point with the longest matching prefix. The process then determines at 807 whether the client has permissions to access the export point. If the client does not have permission to access the export point, then the process returns an error message to the client at 815, and the process ends. If the client does have permission, than the process next determines at 808 whether the pathname in the request exactly matches the pathname of the corresponding export point in the export of the table. If there is an exact match, then at 809 the process returns the filehandle of the export point (as specified in the exports table) to the requesting client, and the process ends.

If, however, the pathname in the request does not exactly match that the pathname of the export point in the exports table, then the process continues with 810, as described below. First, though, some additional explanation may be useful. Assume, for example, the following set of exports and permissions:

/vol/volX -actual=/vol/volY/flow, rw=h1:h2
/vol/volX/dir1-actual=/vol/volY/flow/dir1, rw=h3:h4
/vol/volY -rw Assume further that a host, h1, requests to mount the following paths:

| ID | Path | Filehandle |
|---|---|---|
| 1 | /vol/volX | 67 |
| 2 | /vol/volX/dir1 | 79 |
| 3 | /vol/volX/dir2 | 73 |
| 4 | /vol/volX/dir1/sub1 | 1033 |

The first two cases above result in exact matches in 808, and the corresponding filehandles are returned to the client at 809. In case 3, however, there is a match on the prefix "/vol/volX", but if the file system is asked to return a filehandle for the entire pathname, i.e. "/vol/volX/dir2", the result would be either the wrong filehandle in the case of an existing /vol/volX or a "ENOENT" ("no entry") error if the path does not exist. Therefore, the longest matching prefix is replaced with the -actual path, yielding "/vol/volY/flow/dir2". The resulting filehandle that is returned is, therefore, 73. The same procedure is used in case 4 (after adding host h1 to the permissions list), yielding a path of "/vol/volY/flow/dir1/sub1" and a filehandle of 1033.

Referring again to FIG. 8, therefore, this sub-process is carried out as follows. After determining that there is no exact match with the pathname in the exports table (808), the process determines at 810 whether the export point has an -actual path specified in the exports table. If the export point does not have an -actual path in the exports table, then the process next assigns a pathname variable, tpath, the pathname in the mount request at 814. The process then requests the filehandle for tpath from the file system at 812, and returns that filehandle to the requesting client at 813, after which the process ends.

If, however, the export point does have an -actual path (810) specified in the exports table, then at 811 the process assigns tpath a value as follows:

*t*path=actual path=(requested path−longest matching prefix)

The process then requests the filehandle for tpath from the file system at 812, and returns that filehandle to the requesting client at 813, after which the process ends.

Figure 9:
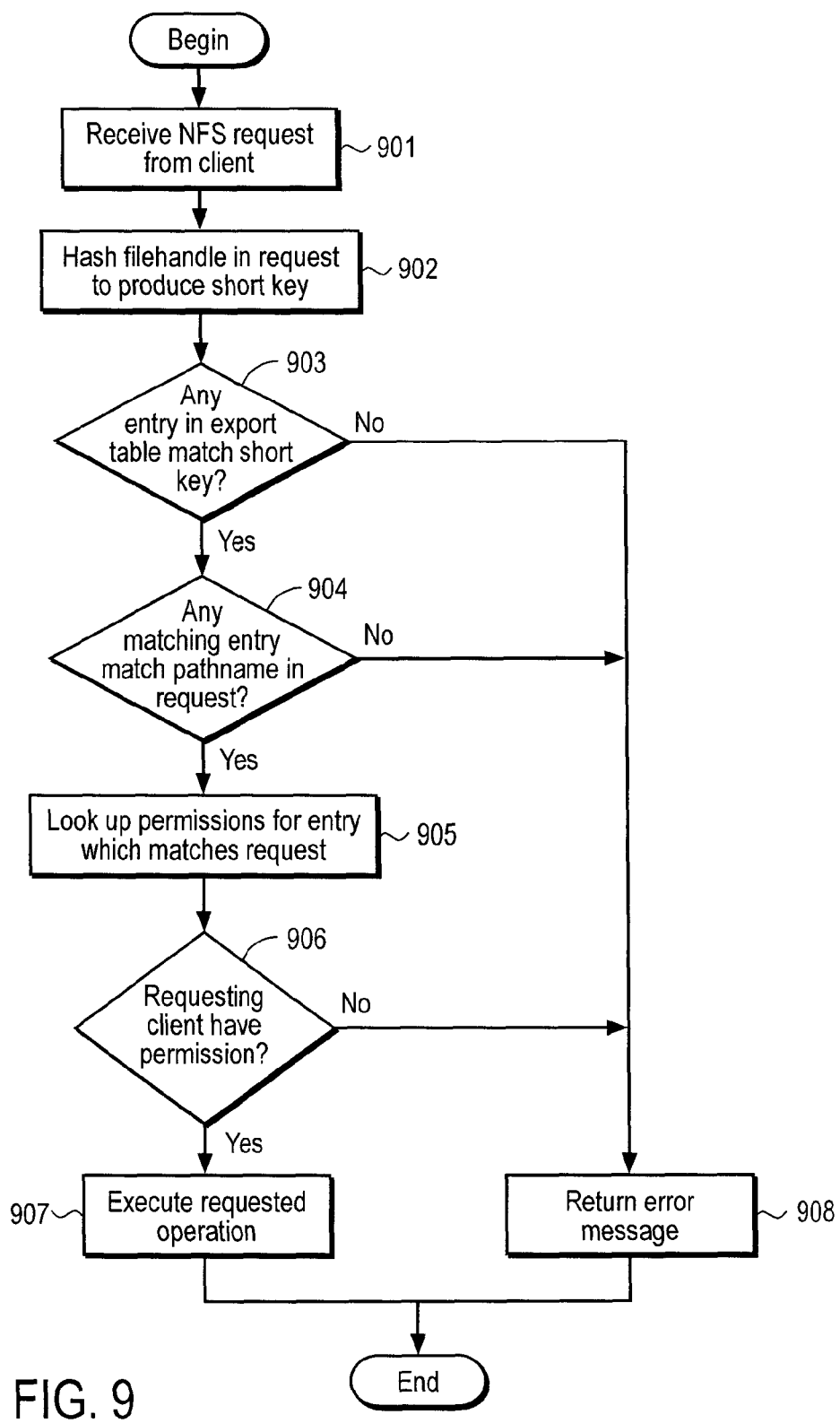
FIG. 9 is a flow diagram showing a process of processing an NFS request.

The third major process performed by a filer 2 is the process of responding to an NFS request (e.g., a read or write request) from a client. Refer now to FIG. 9, which shows an example of such process according to certain embodiments of the invention. Initially, at 901 the filer 2 receives an NFS request from a client 1. The request includes a pathname and the filehandle of the resource which the client 1 is attempting to read or write. At 902 the process hashes the filehandle request to produce a short key. If there is at least one entry in the exports table which matches the filehandle short key (903), the process continues from 904. Otherwise, the process generates returns an error message to the client at 908, and the process then ends.

If there is at least one matching entry, then the process next determines at 904 whether any of the matching entries in the exports table has a pathname that matches the pathname in the NFS request. If there is no matching entry, the process returns an error message to the client at 908, and the process ends. If there is a matching entry, then the process looks up the permissions for the matching entry in the exports table at 905. If the requesting client has permission to access the resource, then the process causes the filer to execute the requested operation (read or write) at 907, and the process then ends. Otherwise, the process returns an error message to the client at 908, and the process then ends.

Thus, a method and apparatus for aliasing exported paths in a storage system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operation of a storage system comprising:
   reading, by the storage system, an export rule associated with an exported resource in the storage system;
   determining whether the export rule includes a directive that associates an advertised pathname of the exported resource with an actual pathname of the exported resource, the advertised pathname identifying a virtual export point and the actual pathname identifying a physical export point;

in response to a determination that the export rule does not include the directive, using the advertised pathname of the exported resource to obtain a filehandle of the exported resource, the filehandle being a value uniquely associated with the exported resource;

in response to a determination that the export rule includes the directive, determining whether the actual pathname of the export resource is the advertised pathname of another resource;

in response to a determination that the export rule includes the directive and that the actual pathname of the export resource is not the advertised pathname of another resource, using the actual pathname to obtain the filehandle of the exported resource without clients of the storage system having knowledge that the exported resource is stored according to the actual pathname; and populating an entry for the exported resource in a data structure with the advertised pathname of the exported resource and the filehandle, the data structure for use in processing requests, from the clients of the storage system, to mount exported resources and enable the client to access the exported resource in the storage system with the filehandle.

2. The method as recited in claim 1, wherein the entry in the data structure further includes a permission relating to a client of the storage system with respect to the exported resource.

3. The method as recited in claim 2, wherein information associated with the exported resource further includes the permission, the method further comprising:

populating the entry for the exported resource in the data structure with the permission.

4. The method as recited in claim 2, further comprising:

receiving a request from a client of the storage system to mount the exported resource;

determining whether the client is permitted to access the exported resource based on the entry for the exported resource in the data structure; and responding to the request according to whether the client is permitted to access the exported resource.

5. A storage system comprising:

a processor;

a storage interface through which to couple the storage system to a plurality of mass storage devices storing a resource;

a network interface through which to receive from a client a request for access to the resource; and a memory having stored therein instructions which, when executed by the processor, cause the storage system to read an export rule associated with the resource in the storage system;

determine whether the export rule includes a directive that associates an advertised pathname of the exported resource with an actual pathname of the exported resource, the advertised pathname identifying a virtual export point and the actual pathname identifying a physical export point;

in response to a determination that the export rule does not include the directive, use an advertised pathname of the resource to obtain a filehandle of the resource, the filehandle being a value uniquely associated with the resource;

in response to a determination that the export rule includes the directive, determine whether an actual pathname of the resource is the advertised pathname of another resource;

in response to a determination that the export rule includes the directive and that the actual pathname of the resource is not the advertised pathname of another resource, use the actual pathname to obtain the filehandle of the resource without client of the storage system having knowledge that the resource is stored according to the actual pathname; and populate an entry for the resource in a data structure with the advertised pathname of the resource and the filehandle, the data structure for use in processing requests, from the client of the storage system, to mount the resource and enable the client to access the resource in the storage system with the filehandle.

6. The storage system as recited in claim 5, wherein the storage system determines access privileges of the client by determining whether the client is permitted to access the resource.

7. The storage system as recited in claim 6, wherein the memory further has stored therein instructions which, when executed by the processor, cause the storage system to return the filehandle of the resource in response to the request if the client is permitted to access the resource.

8. The storage system as recited in claim 5, wherein the data structure further contains the access privileges for the resource, and wherein the storage system determines the access privileges by accessing the data structure.

9. The storage system as recited in claim 5, wherein the storage system comprises a file server.

10. The storage system as recited in claim 5, wherein the storage system provides a set of clients with block-level access to stored data.

11. A storage system, comprising:

means for reading an export rule associated with an exported resource in the storage system;

means for determining whether the export rule includes a directive that associates an advertised pathname of the exported resource with an actual pathname of the exported resource, the advertised pathname identifying a virtual export point and the actual pathname identifying a physical export point;

means for using the advertised pathname of the exported resource to obtain a filehandle of the exported resource, in response to a determination that the export rule does not include the directive, the filehandle being a value uniquely associated with the exported resource;

means for determining whether the actual pathname of the export resource is the advertised pathname of another resource, in response to a determination that the export rule includes the directive;

means for using the actual pathname to obtain the filehandle of the exported resource without clients of the storage system having knowledge that the exported resource is stored according to the actual pathname, in response to a determination that the export rule includes the directive and that the actual pathname of the export resource is not the advertised pathname of another resource; and means for populating an entry for the exported resource in a data structure with the advertised pathname of the exported resource and the filehandle, the data structure for use in processing requests, from the clients of the storage system, to mount exported resources and enable the client to access the exported resource in the storage system with the filehandle.

12. The storage system as recited in claim 11, wherein the entry in the data structure further includes a permission relating to a client of the storage system with respect to the exported resource.

13. The storage system as recited in claim 12, wherein information associated with the exported resource further includes the permission, the storage system further comprising:

means for populating the entry for the exported resource in the data structure with the permission.

14. The storage system as recited in claim 12, further comprising:

means for receiving a request from a client of the storage system to mount the exported resource;

means for determining whether the client is permitted to access the exported resource based on the entry for the exported resource in the data structure; and means for responding to the request according to whether the client is permitted to access the exported resource.

* * * * *